April 17, 1951      D. M. JACOB      2,549,473

RADAR EQUIPMENT CALIBRATING SYSTEM

Filed Jan. 30, 1945      2 Sheets-Sheet 1

Inventor:
Don M. Jacob,
by Harry E. Dunham
His Attorney

April 17, 1951  D. M. JACOB  2,549,473
RADAR EQUIPMENT CALIBRATING SYSTEM
Filed Jan. 30, 1945  2 Sheets-Sheet 2
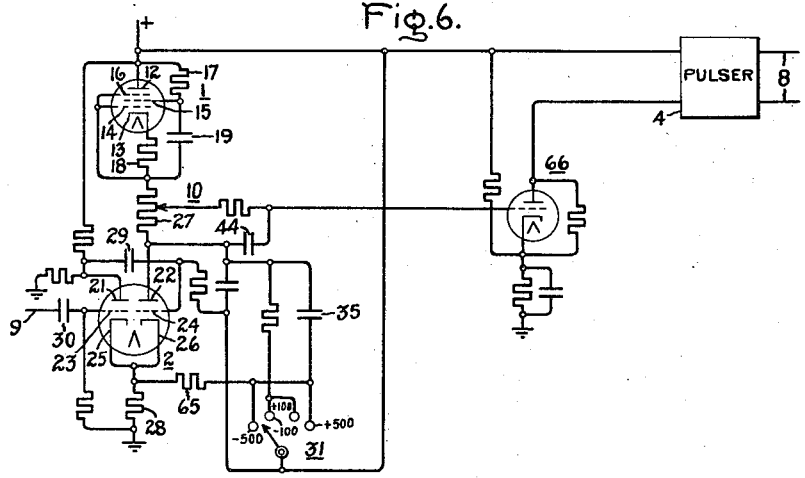
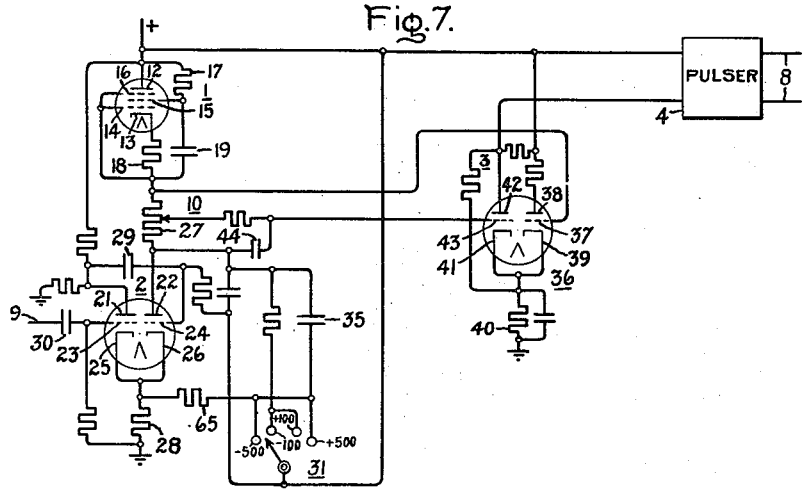
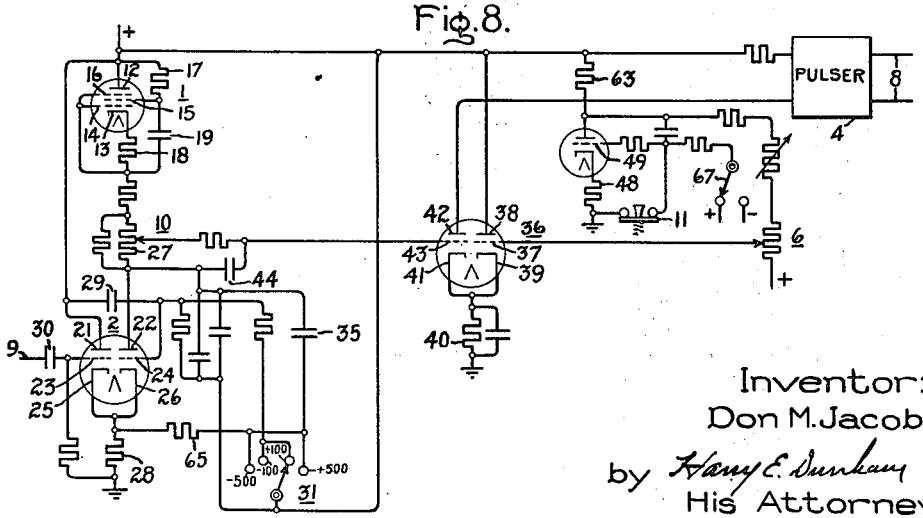
Inventor:
Don M. Jacob,
by Harry E. Dunham
His Attorney.

Patented Apr. 17, 1951

2,549,473

UNITED STATES PATENT OFFICE 2,549,473

RADAR EQUIPMENT CALIBRATING SYSTEM

Don M. Jacob, Schenectady, N. Y., assignor to General Electric Company, a corporation of New York Application January 30, 1945, Serial No. 575,309

18 Claims. (Cl. 343—5)

This invention relates to pulse echo systems and more particularly to means for calibrating certain of the indicating devices in such systems.

Pulse echo systems have been proposed for the determination of the range and relative velocity of a desired object. Such systems are useful on moving objects, such as aircraft and ships, for studying the relative motion of other moving objects, or for indicating the approach of a moving object to a fixed object. Thus, it may be desired to determine the relative speed between relatively nearby aircraft and also to determine whether the distance between them is becoming less or greater. For the satisfactory operation of such systems, it is necessary to have available testing equipment for calibrating accurately the indicating instruments associated with the pulse echo system.

It is an object of my invention to provide calibrating or testing equipment capable of checking either the range or relative velocity indicators, or both, in pulse echo systems.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 is a schematic diagram of the circuits constituting one embodiment of my invention, Figs. 2 to 5 inclusive are diagrams illustrating operating characteristics of the circuit illustrated in Fig. 1, Fig. 6 is a second embodiment of my invention, Fig. 7 is a modification of the circuit shown in Fig. 6, and Fig. 8 is still another embodiment of my invention.

In accordance with my invention, there is provided calibrating apparatus which provides an artificial target pulse which can be made to move over a wide range of relative distances at a wide range of relative velocities with respect to an external input synchronizing pulse derived from the pulse echo system being calibrated.

Figure 1:
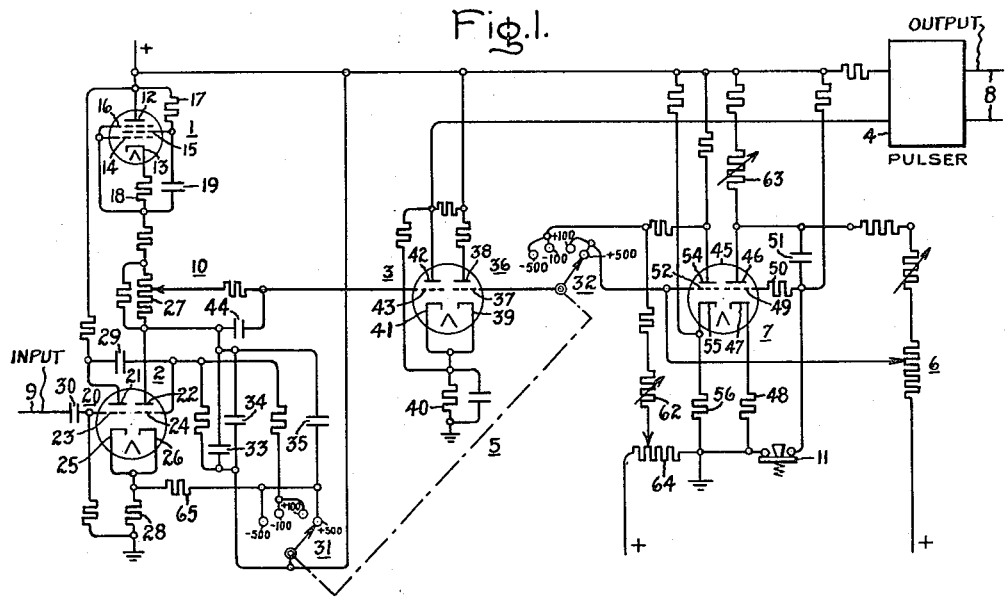

Referring to Fig. 1 of the drawing, there is provided a fast sweep generator 1 arranged to generate a timing wave at a recurrence rate of the order of microseconds. There is also provided gating means 2 for initiating operation of the fast sweep generator in response to suitable synchronizing pulses received from the pulse echo system. The voltage obtained from the fast sweep generator is impressed upon a trigger device 3 which in turn triggers a suitable pulsing device 4. The artificial target pulses emitted from the pulser are impressed on the pulse echo system to be calibrated.

The circuit shown in Fig. 1 is designed to calibrate velocities at two levels. The absolute values of the velocities will depend upon the values of the various components of the circuit. In the particular example illustrated herein, the velocities are of the order of 100 and 500 miles per hour away from or toward the reference point which in practical operation is the side of the pulse echo equipment. In order to choose the approximate rate and direction of travel there is provided a two arm switch 5 having plus and minus 100 miles per hour positions and plus and minus 500 miles per hour positions, the terms plus and minus referring to the relative approach and recession, respectively, of the objects involved. The position of switch 5 determines the maximum velocity to be calibrated. In order to select a lower velocity than the maximum, there is provided a fractional velocity multiplier or control 6 shown in the form of a potentiometer. When the arm of the potentiometer engages one end of the resistance the velocity is minimum and when the arm is at the other end of the resistance the velocity is the maximum for the setting of switch 5. In operation, assuming power is suitably connected to the circuit, and output leads 8 and input lead 9 are suitably connected to the equipment to be tested, the relative velocity control 5 is turned to the desired position. For purposes of description, let it be assumed that the switch 5 is turned to the plus 500 miles per hour position as indicated in Fig. 1. The velocity multiplier potentiometer 6 is set to a position corresponding to the absolute velocity to be calibrated as, for example, 350 miles per hour. There is provided an initial range control 10 which is operated until the pulse echo equipment being calibrated locks on the artificial target pulse from the pulsing device 4. Under these conditions the range indicator of the pulse echo equipment now varies as the range of the artificial target changes.

Hold down switch 11 is then pressed, making operative the slow sweep generator to modify the bias or threshhold of the trigger device 3. By reason of changing bias during the operative period of the second sweep generator 7, as hereinafter explained, the target indication will move in the selected direction (toward the operator for conditions as illustrated in Fig. 1) at a selected rate (determined by the relative velocity switch 5 and velocity multiplier potentiometer 6).

Describing my invention in greater detail, the fast sweep generator 1 includes an electron discharge device illustrated as being of the pentode type having an anode 12, a cathode 13, control electrode 14, screen grid electrode 15 and suppressor grid 16. The anode 12 is connected to a suitable source of positive potential, the negative terminal of said source being grounded. The screen electrode 15 is connected to a suitable source of potential through a suitable voltage limiting resistor 17. The cathode 13 is connected to the upper end of a cathode bias resistor 18. The suppressor grid 16 and control electrode 14 are connected together and to the lower end of resistor 18. In order to maintain relatively constant the potential on screen electrode 15 with respect to the cathode, there is provided a capacitor 19 connected between the screen electrode 15 and the lower end of resistor 18. In series with the above-described electron discharge device, there is a second electron discharge device 20 which may be a suitable double-triode type having anodes 21 and 22, control electrodes 23 and 24 and cathodes 25 and 26 respectively. The cathode 13 is connected to the anode 22 through the bias resistor 18 and the initial range control 10 including potentiometer 27. The cathodes 25 and 26 are connected together and to ground through a bias resistor 28. The control electrode 24 is connected to the anode 21 through a suitable capacitor 29. The two sides of the electron discharge device 20 are connected together for multivibrator operation with the right hand side normally conducting and the left hand side normally cut off. When a sufficiently positive synchronizing pulse from the pulse echo system is impressed upon the control electrode 23, as by means of a suitable coupling capacitor 30, multivibrator action quickly renders the left side conductive and the right side of electron discharge device 20 non-conductive, the control electrode 24 having been driven sufficiently negative to cut off the discharge current.

The relative velocity switch 5 comprises a pair of switch elements 31 and 32 having switch arms arranged to engage a plurality of contacts as indicated in the drawing. As briefly explained heretofore there are four switch positions. The first position represents a negative velocity of 500 miles per hour, the second position represents a negative rate of 100 miles per hour, the third position represents a positive rate of 100 miles per hour and the fourth position (indicated in the drawing) represents a positive rate of 500 miles per hour. The switch arm of switch element 31 is connected to a suitable source of positive potential and also to one side of capacitors 33 and 34. The negative and positive 500 miles per hour contacts of switch element 31 are connected together and to one side of capacitor 35. The other sides of capacitors 33, 34 and 35 are connected together and to the junction between anode 22 and potentiometer 27. Thus, when the relative velocity switch 5 is in one of the 500 miles per hour positions all three capacitors are connected in parallel to the source of positive potential whereas in the 100 miles per hour position of the switch only capacitors 33 and 34 are connected to the source of potential.

When the right hand side of discharge device 20 is conducting, the capacitors connected in the circuit become charged. At the instant that discharge device 20 is cut off, the lower sides of capacitors 33 and 34 (and capacitor 35 in either of the 500 miles per hour positions) are at the potential of the positive source and the upper sides of the capacitors are at the potential of anode 22. While the right hand side of discharge device 20 is cut off, the potential of the upper sides of the capacitors rises substantially linearly toward that of the lower side.

Figure 2:
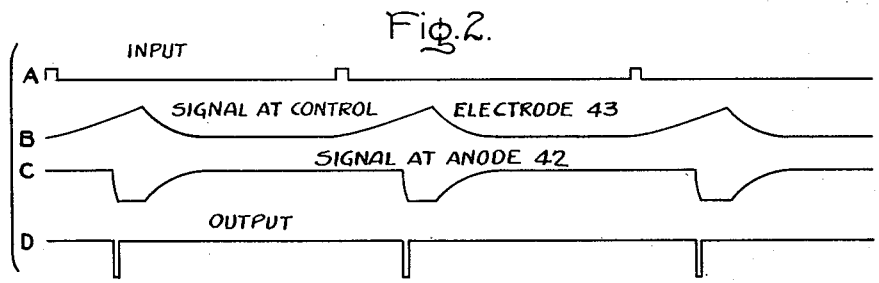

The action thus far described is indicated graphically in Fig. 2. At line A there are illustrated representative positive synchronizing pulses. Line B represents the potential at the upper sides of the capacitors 33 and 34 and hence, at the anode 22 of discharge device 20. When the right side of discharge device 20 again becomes conductive, the potential at the upper sides of the capacitors falls to its normal value and the sweep generator and gating means are conditioned for the next synchronizing pulse.

The trigger device 3 comprises an electron discharge device 36 of a suitable double triode type although two separate suitable electron discharge devices may be used. The right hand side acts as a cathode follower and normally conducts current in an amount depending upon the potential appearing at the control electrode 37. This potential is determined by the setting of the relative velocity switch 5. The anode 38 is connected to a suitable source of positive potential. The cathode 39 is connected to ground through a suitable bias resistor 40. The cathode 41 of the left hand or trigger side of the discharge device 36 is connected to cathode 39 and the upper end of resistor 40. The anode 42 is connected to the pulsing device 4. The control electrode 43 is connected to the arm of the potentiometer 27 through a suitable potential limiting resistor. In order to minimize the effect of the grid-cathode capacity in the left hand side of discharge device 36, a suitable capacitor 44 is connected between anode 22 and control electrode 43.

As the potential at the lower end of potentiometer 27 increases, the potential at the control electrode 43 increases proportionately. Eventually, depending upon the bias established for the trigger device, the left hand side conducts current. Thus, at a certain delay time after the synchronizing pulse is applied to control electrode 23 of discharge device 20, a time interval depending upon the setting of the potentiometer 27 and the bias of the left side of discharge device 36, a trigger pulse appears on anode 42 as indicated at line C in Fig. 2 which results in the emission of an artificial target pulse from the pulser 4 as indicated at line D in Fig. 2.

The apparatus thus far described is sufficient to calibrate the range indicator of a pulse echo system. For example, a range within the limits of the pulse echo system and the calibrating device is selected by properly adjusting potentiometer 27. Assuming connection of the calibration device to the pulse echo system, the artificial target pulse should appear at the chosen range mark on the pulse echo equipment. In order to check different ranges, it is simply necessary to change the setting of potentiometer 27. In a typical embodiment of this circuit, capacitors 33, 34 and 35 are so chosen that the range coverage with switch 5 in the 100 miles per hour setting is approximately 400 to 4000 yards and in the other setting approximately 1000 to 18,000 yards. In some cases, the entire desired range may be covered with only one value of capacity but where an extended range coverage is required, more satisfactory results are obtained if several condensers are used because of improved accuracy obtained, and minimum voltage source requirements.

In order to calibrate that portion of the pulse echo system used for checking the relative velocities of moving objects, there is provided means for continuously, and preferably linearly, varying the threshold on the trigger side of discharge device 36 in either the positive or negative direction. For this purpose, there is provided the slow sweep generator 7 having a period of recurrence of the order of seconds (it will be recalled that the period of recurrence of the fast sweep generator is of the order of microseconds). The voltage derived from the slow sweep generator is applied to the control electrode 37 of electron discharge device 36. Any change in the bias of control electrode 37 varies the current through the resistor 40 and hence the threshold of the left hand side of electron discharge device 36. Accordingly, it will take a shorter or longer time for the linearly increasing voltage applied to control electrode 43 to overcome the threshold depending upon the direction in which the potential of control electrode 37 is changing.

The illustrated slow sweep generator 7 includes an electron discharge device 45 which may be of a suitable double triode type. The anode 46 of the right hand side is connected to a suitable source of positive potential through the positive range set control 63 illustrated in the form of a variable resistor. The cathode 47 is connected to ground through a suitable bias resistor 48. The control electrode 49 is connected to ground through a resistor 50 and normally closed hold down switch 11. A suitable capacitor 51 is connected between anode 46 and the junction between resistor 50 and hold down switch 11. The junction between hold down switch 11 and capacitor 51 is connected to a suitable source of positive potential. With this arrangement, the control electrode 49 is normally grounded through the switch 11. When it is desired to initiate operation of the slow sweep generator, hold down switch 11 is pressed thereby opening the circuit from grid to ground. As soon as the switch 11 is opened the lower side of capacitor 51 is released from ground and the capacitor 51 begins to discharge substantially linearly until the switch is released, thereby again grounding the capacitor, or until grid current flows in the right hand side of discharge device 45. The potential on control electrode 49 follows the voltage on the lower side of capacitor 51 so that as this voltage increases linearly, the current flow through the right hand side of discharge device 45 increases proportionately. As a result, the potential of anode 46 decreases linearly and therefore a linearly decreasing voltage appears across velocity multiplier 6. The arm of the velocity multiplier potentiometer is connected to control electrode 52 of the left hand or phase inverter side of discharge device 45 and to the plus 100 miles per hour and plus 500 miles per hour contacts on switch element 32. Therefore, the decreasing voltage causes the potential on control electrode 37 of discharge device 36 to decrease whenever the switch 32 is engaging the positive rate contacts. As a result, with switch 5 in the position shown, the current through the cathode follower side of discharge device 36 decreases, the current through resistor 40 decreases and the threshold on the left hand or trigger side of discharge device 36 also decreases continuously and substantially linearly. Therefore, the trigger side triggers continuously faster as long as the hold down switch 11 is held open or until grid current flows in the right hand side of discharge device 45.

Figure 3:
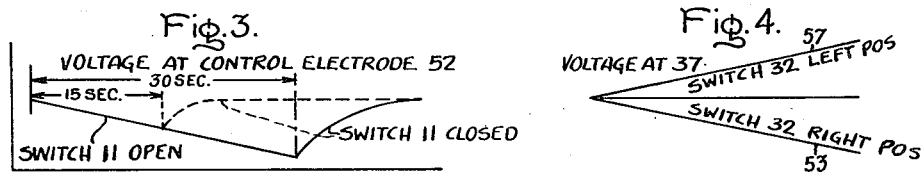
Figure 4:
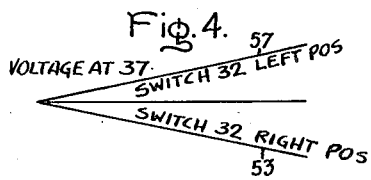

Fig. 3 represents the effect of holding open the switch 11 for different lengths of time. In a typical embodiment of my invention approximately 40 seconds is required to cause grid current to flow in the right hand side of discharge device 45. The full line in Fig. 3 is representative of the condition where the switch 11 is held open for 30 seconds. If the switch is held open only 15 seconds, the charging voltage follows the same line but halts sooner and at a lower maximum amplitude as indicated by the dashed line. In Fig. 4 the line 53 represents the continuously and linearly decreasing voltage appearing at control electrode 37.

The anode 54 of the left hand or phase inverter side of discharge device 45 is connected to a suitable source of positive potential and to the negative switch contacts of switch element 32 through a suitable voltage limiting resistor. The cathode 55 is connected to ground through a suitable bias resistor 56. As the voltage on control electrode 52 decreases, as explained above, the current through the left hand side of discharge device 45 decreases whereby the potential of anode 54 increases continuously and substantially linearly as indicated by the line 57 in Fig. 4. Whenever the switch arm of switch element 32 is turned to a position in which the switch arm engages either of the negative rate contacts, the potential on control electrode 37 will continuously and linearly increase in the positive direction, when switch 11 is opened, causing a continuous increase in current through the right hand side of discharge device 36, a continuous increase in current through resistor 40 and therefore a continuous substantially linear increase in the threshold of the left hand side of the discharge device 36 and so, as time goes on, an increasingly higher voltage is required from the initial range control potentiometer 27 to cause triggering of the pulser.

Figure 5:
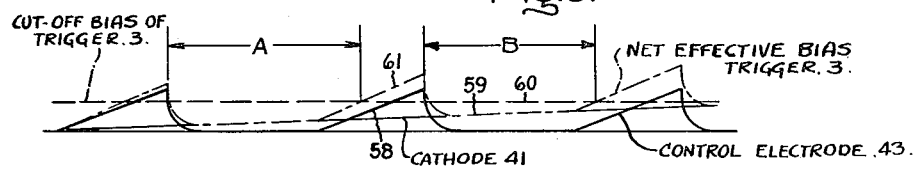

Hence, the rate of recurrence of trigger pulses increases or decreases at a uniform rate in accordance with the direction of change of relative potential of the potential impressed on the control electrode of the right hand side of discharge device 36 and therefore in accordance with the direction in and extent to which the threshold is modified when the slow sweep generator is operative. Fig. 5 depicts graphically the variation in trigger time of the discharge device 36. Time relationships have been distorted to illustrate clearly operating characteristics. The line 58 represents the sweep voltage applied to control electrode 43 as a result of the operation of the fast sweep generator and gating means. The line 59 represents a gradually increasing threshold at the left hand side of discharge device 36. Line 60 represents the normal threshold or cut-off bias on the left hand side of discharge device 36. Line 61 represents the resulting variation of potential on control electrode 43 of discharge device 36. Whenever the resultant effective control electrode potential crosses the cut-off line, represented by the numeral 60, the trigger device is rendered operative. It will be noted that as time passes, the intervals between successive periods of energization of the left hand side of device 36, as indicated by A and B in Fig. 5, becomes less and less. If the switch 5 is in one of the negative rate positions, a similar analysis would show triggering at greater and greater intervals as the hold down switch is operated.

Means is provided to make the range of the artificial target pulses independent of the setting of velocity multiplier 6. This is accomplished by adjusting the voltage on the anode 46 to the same amplitude as that on the lower end of the velocity multiplier. With such an arrangement, variation of the arm of potentiometer 6 will not upset the voltage relationships on the right hand side of discharge device 45 and the starting potential on the arm of velocity multiplier 6 will always be zero, assuming proper adjustment of resistor 63.

In order to provide, at any given range, the same rate of change of relative velocities for approach and recession tests, there is provided an adjustable resistance 62 connected between the negative contacts of the switch element 32 and the arm of the potentiometer comprising the negative rate range set control 64. The same starting voltage at switch 5 may be obtained for the positive and negative directions of relative velocity by changing the negative rate range set control 64. In other words, the starting voltage on the negative rate contacts of switch element 32 is determined by the setting of potentiometer 64 and negative rate calibration resistance 62. The starting voltage on the positive contacts of the switch element 32 depends upon the setting of the resistor 63 and the velocity multiplier 6, assuming that the voltage across control 6 has been properly adjusted to zero.

In order to compensate for the different cathode currents obtained in resistor 28 of gating means 2 in the 100 and 500 miles per hour positions of switch 5 and provide equal bias for the left hand side of device 29 in all positions of switch 5, there is connected between cathode 26 and the lower end of capacitor 35 a suitable resistor 65.

Fig. 6 shows a modification of my invention arranged for range calibration only. With this arrangement the slow sweep generator and velocity multiplier are omitted and the trigger device is simply a triode 66 connected for operation in the same manner as the trigger or left hand side of trigger means 3 in Fig. 1. The switch element 32 of relative velocity switch 5 is also unnecessary. The operation is the same as the corresponding portion of Fig. 1.

Fig. 7 illustrates an improvement over the embodiment shown in Fig. 6. In this modification the double triode 33 of trigger means 3 is employed in the same manner as shown in Fig. 1 except that the control electrode 37 of the right hand side of electron discharge device 36 is connected to the junction between capacitor 19 and the upper end of range control 10 instead of being connected to the switch arm of switch element 32 of Fig. 1. With this arrangement any voltage variations in the fast sweep generator will be compensated for whereby the range indicator will be more accurate than with the arrangement shown in Fig. 6. Any variation in voltage on the lower side of capacitor 19 is impressed upon control electrode 37. Since the right hand side of device 36 is connected as a cathode follower, any changes will be reflected in compensating changes in bias at resistor 40. For example, if the voltage at the lower end of capacitor 19 decreases, the effect without the connection to control electrode 37 is to decrease the potential impressed on control electrode 43 and, hence, the triggering of the pulsing device 4 is delayed. However, with the connection of Fig. 7, the decrease in voltage results in a decrease in current through the right hand side of discharge device 36 causing a decrease in current through resistor 40. There results a lowering of the threshold on the left hand side of the discharge device so that a lower potential on control electrode 43 is required to cause conductivity through the left hand side of the electron discharge device. Of course, the above-described connection can also be made in the circuit of Fig. 1 with improved stability.

Fig. 8 illustrates a second embodiment of the invention disclosed in Fig. 1. Referring again to Fig. 1, the effect of approach and recession of target was accomplished by providing an increasing or decreasing potential on control electrode 37 of discharge device 36. The same general effect may be achieved by employing a switch 67 arranged to impress either a positive or a negative potential on control electrode 49 of the slow sweep generator. In this embodiment of my invention, the variable resistor 63 is omitted so that the normal potential across the velocity multiplier 6 is not zero as was the case in the circuit of Fig. 1. Hence, the normal potential on control electrode 37 of discharge device 36 of Fig. 1 is no longer zero when the hold down switch 11 is in its closed position but is some positive value, the actual amplitude depending upon the position of the arm of the velocity multiplier. Therefore, whenever the position of the velocity multiplier is adjusted the range control 10 must also be varied to compensate for the change of level in potential. If desired, the range control 10 and velocity multiplier 6 may be ganged together.

The slow sweep generator described herein is described and claimed in the copending application of Philip C. Michel, Serial No. 576,567, filed January 30, 1945, now Patent No. 2,460,142, granted January 25, 1949, and assigned to the same assignee as the present invention. Certain details of the fast sweep generator are further described and claimed in my divisional application Serial No. 24,151, filed April 30, 1948, Patent No. 2,523,763, granted September 26, 1950, and also assigned to the assignee hereof.

While I have shown and described a particular embodiment of my invention, it will be obvious to those skilled in the art that changes and modifications may be made without departing from my invention in its broader aspects, and I therefore aim in the appended claims to cover all such changes and modifications as fall within the true spirit and scope of my invention.

What I claim as new and desire to secure by Letters Patent of the United States is:

1. In combination, an electron discharge device having an anode, a cathode and a control electrode, means for biasing said control electrode to a predetermined point of operation, means for impressing a sweep voltage on said control electrode whereby said discharge device becomes conductive when the potential on said control electrode exceeds the predetermined bias, means for generating a control voltage, and means varying the predetermined bias on said control electrode in a predetermined direction in accordance with said control voltage during the interval of time in which said sweep voltage is impressed on said control electrode.

2. In combination, an electron discharge device having an anode, a control electrode, and a cathode, means for biasing said discharge device to a predetermined point of operation, means for applying a sweep voltage to said control electrode whereby said discharge device is rendered conductive when said bias is exceeded, means for generating a control voltage, and means continuously varying said bias in accordance with said control voltage whereby said discharge device becomes recurrently conductive at shorter or greater intervals depending upon the direction of said variation of bias.

3. In combination, an electron discharge device having an anode, a control electrode, and a cathode, means for biasing said discharge device to a predetermined point of operation, means for applying a sweep voltage to said control electrode whereby said discharge device is rendered conductive when said bias is exceeded, means for generating a second sweep voltage, means utilizing said second sweep voltage for continuously changing the bias on said control electrode whereby the rate of recurrence of conductivity in said discharge device varies in accordance with the rate and direction of change of said second sweep voltage.

4. In combination, an electron discharge device having an anode, a control electrode, and a cathode, means for biasing said discharge device to a predetermined point of operation, means for applying a sweep voltage to said control electrode whereby said discharge device is rendered conductive when said bias is exceeded, means for generating a second sweep voltage, means for selectively determining the relative polarity and rate of change of said second sweep voltage, and means utilizing said second sweep voltage for continuously changing the bias on said control electrode whereby the rate of recurrence of conductivity in said discharge device varies in accordance with said rate and direction of change of said second sweep voltage.

5. In combination, an electron discharge device having an anode, a cathode, and a control electrode, means for biasing said control electrode to a predetermined point of operation, means for generating a sweep voltage, means for initiating operation of said sweep means, means for impressing said sweep voltage on said control electrode, a second means for generating a sweep voltage, and means utilizing said second sweep voltage for varying the predetermined bias of said electron discharge device, the sum of all of said biasing voltages approaching in value the cut-off bias voltage of said device after said initiation of operation whereby the condition of said device is altered between conduction and non-conduction at a time after said initiation of operation depending upon the relative directions and rates of change of said respective sweep voltages.

6. In combination, in a pulse echo system calibrating device, means for generating a timing wave of voltage, means responsive to recurrent pulses received from said system for initiating said generation at each pulse, means for generating recurrent spaced-apart echo simulating pulses, means utilizing said timing wave for rendering said generating means operative at predetermined times with respect to said received pulses, and means supplying a second timing wave of a magnitude continuously changing at a predetermined constant rate in a predetermined direction to said last means to vary continuously said predetermined time for successive received pulses.

7. In a calibrating or testing device for pulse echo systems, a first generator for producing a first voltage of increasing amplitude, means for rendering operative said first generator in response to pulses from the system to be tested or calibrated, means for generating artificial target echoes to be impressed on said system, means utilizing said first voltage for triggering said echo generator at a predetermined time after said pulses corresponding to a predetermined target range, a second generator arranged to produce a varying second voltage, the period of variation of said second voltage being appreciably longer than that of said first voltage, and means utilizing said second voltage for modifying the starting time of said triggering means in accordance with the variation in amplitude of the voltage of said second generator.

8. In a calibrating or testing device for pulse echo systems, a first generator for producing a first voltage of substantially linearly increasing amplitude, means for rendering operative said first generator in response to pulses from the system to be tested or calibrated, means for generating artificial echo pulses to be impressed on said system, means utilizing said first voltage for triggering said echo pulse generator at a predetermined time after said pulses corresponding to a predetermined target range, a second generator arranged to produce a voltage of substantially linearly varying amplitude, the period of variation of said second voltage being appreciably longer than that of said first voltage, and means utilizing said second voltage for continuously varying at a predetermined rate the starting time of said triggering means.

9. In a calibrating or testing device for pulse echo systems, a first generator for producing a first voltage of increasing amplitude, means for rendering operative said generator in response to pulses from the system to be tested or calibrated, means for generating artificial target echoes to be impressed on said system, means utilizing the voltage from said generator for triggering said echo generator at a predetermined time after said pulses corresponding to a predetermined target range, a second generator arranged to produce a second voltage of varying amplitude, the period of variation of said second voltage being appreciably longer than that of said first voltage, and means utilizing said second voltage for modifying the starting time of said triggering means in accordance with the variation in amplitude of said second voltage, the sense of the variation in starting time depending upon the relative polarity of said second voltage, and means for selecting the desired relative polarity.

10. In a calibrating or testing device for pulse echo systems, a first generator for producing a first voltage of increasing amplitude, means for rendering operative said generator in response to pulses from the system to be tested or calibrated, means for generating artificial echo pulses to be impressed on said system, means utilizing said first voltage for triggering said echo pulse generator at a predetermined time after said pulses from said system corresponding to a predetermined target range, means comprising a second generator to produce two varying amplitude voltages of opposite relative polarity, the period of variation of said two varying amplitude voltages from said last means being appreciably longer than that of said first voltage, means to select a desired one of said two varying amplitude voltages, and means utilizing the selected one of the voltages from said last means for modifying the starting time of said triggering means in a direction corresponding to the polarity of the selected one of said two voltages.

11. In a calibrating or testing device for pulse echo systems, a first generator for producing a first voltage of increasing amplitude, means for rendering operative said generator in response to a pulse from said system, means for generating artificial echo pulses to be impressed on said system, adjustable means utilizing the voltage from said first generator for triggering said echo pulse generating means at an adjustable predetermined time after said pulses from said system whereby said echo pulses are delayed to correspond to a predetermined target range in accord with the adjusted delay, a second generator arranged to produce a second voltage of varying amplitude, the period of variation of said second voltage from said second generator being appreciably longer than that of said first voltage, and means utilizing said second voltage for modifying the starting time as adjusted of said triggering means.

12. In a calibrating or testing device for pulse echo systems, a first generator for producing a first voltage of increasing amplitude, means for rendering operative said generator in response to pulses from the system to be tested or calibrated, means for generating artificial echo pulses to be impressed on said system, means utilizing the first voltage from said first generator for triggering said echo pulse generator at a predetermined time after said pulses from said system corresponding to a predetermined target range, a second generator arranged to produce a second voltage of varying amplitude, the period of variation of said second voltage from said second generator being appreciably longer than that of said first voltage and means utilizing said second voltage for modifying the starting time of said triggering means, and control means biased to maintain inoperative said second generator, said control means being operative against said bias to initiate operation of said second generator.

13. In combination, a sweep generator comprising a source of direct current potential, a capacitor, one side of which is connected to the positive terminal of such source of potential, a resistor and an electron discharge device connected in series across said capacitor, the anode of said device being connected to said positive terminal, switching means connected between the other side of said capacitor and the negative terminal of said source of potential for causing said capacitor to charge when said switching means is electrically conductive and to discharge when there is no electrically conductive circuit through said switching means whereby the charge on said other side of said capacitor rises substantially linearly and thereby causes a change in potential across said resistor, pulse generating means, and means utilizing the change of potential on said resistor for rendering operative said pulse generating means when the rising potential reaches a predetermined amplitude.

14. A sweep generator comprising a source of direct current potential, a capacitor, one side of said capacitor being connected to the positive terminal of said source of potential, a resistor and an electron discharge device connected in series across said capacitor, the anode of said device being connected to said positive terminal, switching means connected between the other side of said capacitor and the negative terminal of said source of potential for causing said capacitor to charge when said switching means is electrically conductive and to discharge when there is no electrically conductive circuit through said switching means whereby the charge on said other side of said capacitor rises substantially linearly thereby causing a change in potential across said resistor, pulse generating means, and means utilizing the change of potential on said resistor for rendering operative said pulse generating means when the rising potential reaches a predetermined amplitude, said resistance being variable to enable adjustment of the amplitude of said potential at the start of the discharge period of said capacitor.

15. In combination, a sweep generator comprising a first electron discharge device having an anode, a cathode, a control electrode and a screen electrode, said anode being connected to a source of positive potential, a second electron discharge device having an anode, a cathode and a control electrode, the last-mentioned cathode being connected to ground through a bias resistor, voltage dividing means connected between the cathode of said first discharge device and the anode of said second discharge device, said discharge devices being arranged to be normally conducting, a capacitor connected between the anode of said second device and the anode of said first device, means for rendering said second discharge device non-conducting to initiate a change of potential on said capacitor whereby the potential on said voltage diving means varies according to the change in potential on said capacitor, pulse generating means, and means utilizing the varying potential on said voltage dividing means for rendering operative said pulse generating means when the varying voltage reaches a predetermined amplitude.

16. In combination, a sweep generator comprising a first electron discharge device having an anode, a cathode, a control electrode and a screen electrode, said anode being connected to a source of positive potential, a second electron discharge device having an anode, a cathode and a control electrode, the last-mentioned cathode being connected to ground through a bias resistor, voltage dividing means connected between the cathode of said first discharge device and the anode of said second discharge device, said discharge devices being arranged to be normally conducting, a capacitor connected between the anode of said second device and the anode of said first device, means for rendering said second discharge device non-conducting to initiate a change of potential on said capacitor whereby the potential on said voltage dividing means varies according to the change on said capacitor, pulse generating means, and means utilizing the varying potential on said voltage dividing means for rendering operative said pulse generator when the varying voltage reaches a predetermined amplitude, said voltage dividing means being adjustable to enable adjustment of the period of time required for said predetermined amplitude to be reached.

17. In combination in a pulse echo system calibrating device, means for generating a timing wave, said timing wave comprising a potential changing at a substantially constant rate in a predetermined direction for a predetermined time, means responsive to recurrent pulses received from said system for initiating said wave generation at each said pulse, means utilizing said timing wave for generating, at the termination of a predetermined time interval following receipt of each said pulse, an echo simulating pulse, and means varying continuously in a given direction of polarity said predetermined time interval for successive received pulses.

18. In combination, an electron discharge device having an anode, a cathode and a control electrode, adjustable resistance means for biasing said control electrode to a predetermined desired point of operation, means for impressing a sweep voltage on said control electrode whereby said discharge device becomes conductive when the potential on said control electrode exceeds said predetermined adjusted bias, and means continuously varying said predetermined bias on said control electrode in a predetermined direction during the interval of time in which said sweep voltage is impressed on said control electrode.

DON M. JACOB.

REFERENCES CITED

The following references are of record in the file of this patent:

UNITED STATES PATENTS

| Number | Name | Date |
|---|---|---|
| 1,924,174 | Wolf | Aug. 29, 1933 |
| 2,052,184 | Lewis | Aug. 25, 1936 |
| 2,114,938 | Puckle | Apr. 19, 1938 |
| 2,189,549 | Hershberger | Feb. 6, 1940 |
| 2,227,598 | Lyman et al. | Jan. 7, 1941 |
| 2,250,708 | Herz | July 29, 1941 |
| 2,300,189 | Wolff | Oct. 27, 1942 |
| 2,341,396 | Smith, Jr. | Feb. 8, 1944 |
| 2,415,095 | Varian | Feb. 4, 1947 |
| 2,421,016 | Deloraine | May 27, 1947 |
| 2,429,623 | Hoisington | Oct. 28, 1947 |
| 2,440,253 | Dodington | Apr. 27, 1948 |